United States Patent
Wachter et al.

[11] 3,936,348
[45] Feb. 3, 1976

[54] METHOD AND APPARATUS FOR DETECTION OF NUCLEAR FUEL ROD FAILURES

[75] Inventors: William J. Wachter; Wesley M. Rohrer, both of Pittsburgh, Pa.

[73] Assignees: Wesley M. Rohrer; William J. Wachter, both of Pittsburgh, Pa.; part interest to each

[22] Filed: Feb. 5, 1973

[21] Appl. No.: 329,635

[52] U.S. Cl. .............................. 176/19 LD; 73/71.4
[51] Int. Cl. ...................... G01m 3/24; G21c 17/06
[58] Field of Search ............ 73/67, 69, 71.4; 176/19

[56] References Cited
UNITED STATES PATENTS
3,240,674   3/1966   Ledwidge .................................. 73/69
3,264,863   8/1966   Maropis ..................................... 73/67

Primary Examiner—Richard C. Queisser
Assistant Examiner—Frederick Shoon
Attorney, Agent, or Firm—Brown, Murray, Flick & Peckham

[57] ABSTRACT

The present invention generally relates to nuclear fuel reactors, and more particularly relates to a method and apparatus, based upon vibration detection and analysis techniques, for detecting a failure or rupture of fuel elements or tubes containing nuclear fuel.

1 Claim, 7 Drawing Figures

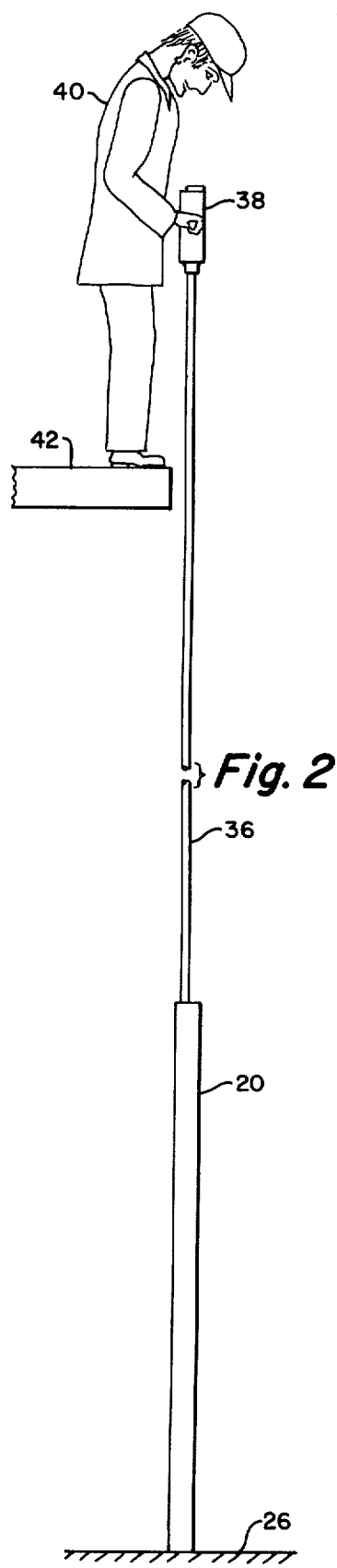
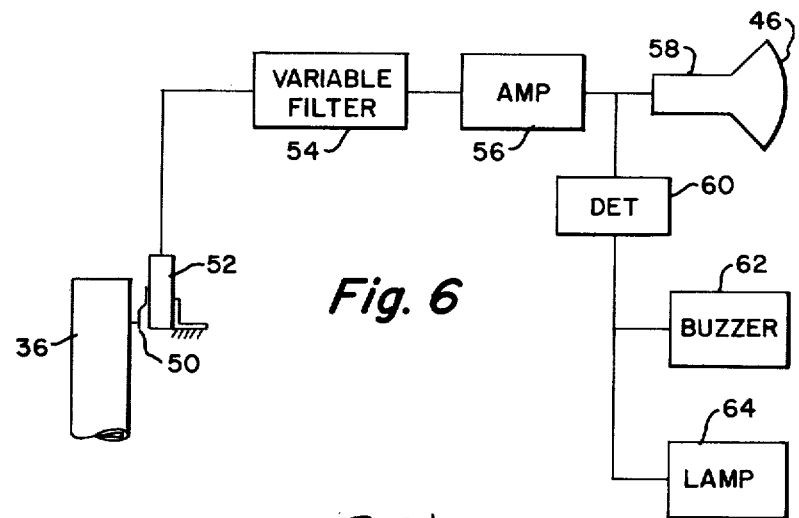
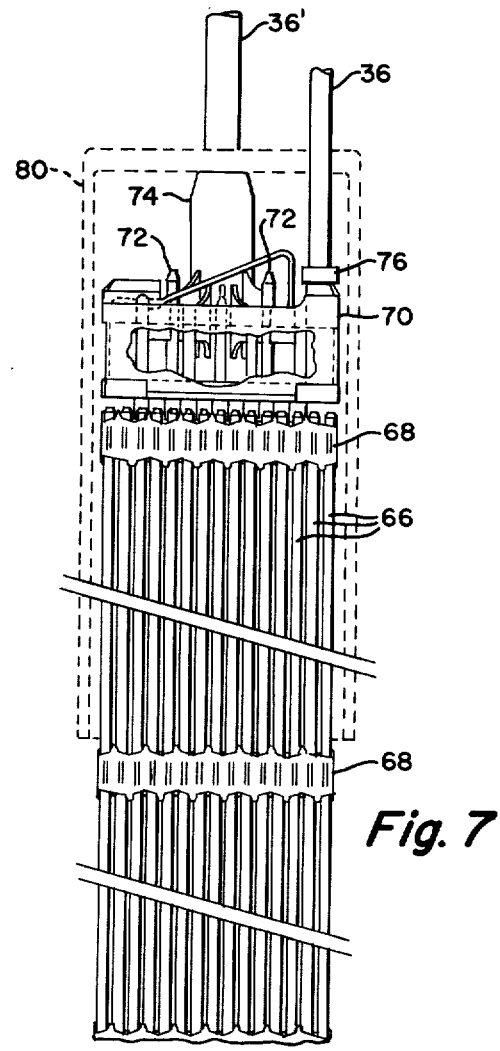

METHOD AND APPARATUS FOR DETECTION OF NUCLEAR FUEL ROD FAILURES

BACKGROUND OF THE INVENTION

As is known, a nuclear reactor consists of thousands of vertical metal tubes supported in parallel arrays. The tubes are grouped into fuel assemblies. Each of the fuel tubes contains uranium oxide nuclear fuel or the equivalent and is sealed to contain fission products generated during the operation of the reactor. Present methods of locating assemblies with fuel tubes that have failed are very slow and usually entail placing a fuel assembly into a container in a spent fuel pool and drawing water from the container through the fuel assembly. The water drawn through the container is then monitored for detection of fission products. Such a process requires a long time, over an hour per fuel assembly. Since the power generated by a large nuclear reactor during full operation is worth a great deal of money, it will be appreciated that a quick method and apparatus for detection of faulty fuel tubes is highly desirable, since it reduces the time that the reactor must be shut down. Such faults usually occur when a hole or crack forms in the wall of a fuel tube. This permits water to enter the interior of the tube where it contacts the uranium oxide or the like, causing corrosion of the fuel tube and further damage. When the fuel is at its usual high temperature during reactor operation, the water within the rod will contact the hot fuel and will boil.

SUMMARY OF THE INVENTION

As an overall object, the present invention provides a method and apparatus for quickly and easily detecting fuel assemblies containing a fault in tubing containing nuclear fuel after the fuel has been irradiated.

More specifically, an object of the invention is to provide a detection method and apparatus of the type described employing vibration detection and analysis techniques.

In accordance with the invention, there is provided a long probe made of a material having a high modulus of elasticity, together with a vibration detector attached to the upper end of the probe. The lower end of the probe is disposed so as to intimately contact the fuel assembly to transmit to the vibration detector the vibrations resulting from highly turbulent or boiling water or other liquid which has leaked into the fuel element tubes. Hence, by detecting a vibration signal having a frequency and/or amplitude characteristic of the vibrations induced by highly turbulent or boiling water or other liquid which has leaked into the fuel element tubes, a faulty tube can be easily identified without the necessity for placing the fuel assembly in a container in the spent fuel pool and thereafter drawing water from the pool through the container and monitoring it for detection of fission products.

The above and other objects and features of the invention will become apparent from the following detailed description taken in connection with the accompanying drawings which form a part of this specification, and in which:

FIG. 2 is an elevational view showing the manner in which the detection apparatus of the invention is placed against the top or side of a fuel assembly immersed within water or other protective atmosphere;

FIG. 6 is a schematic circuit diagram showing the manner in which vibrations induced in the detecting probe of the invention are converted into electrical oscillations which are displayed on a CRT tube; and FIG. 7 is an enlarged view of a typical fuel assembly showing a representative location of the bottom of the detecting probe of the invention with respect to that fuel assembly for detection of a fuel assembly having a faulty fuel tube.

Figure 1:
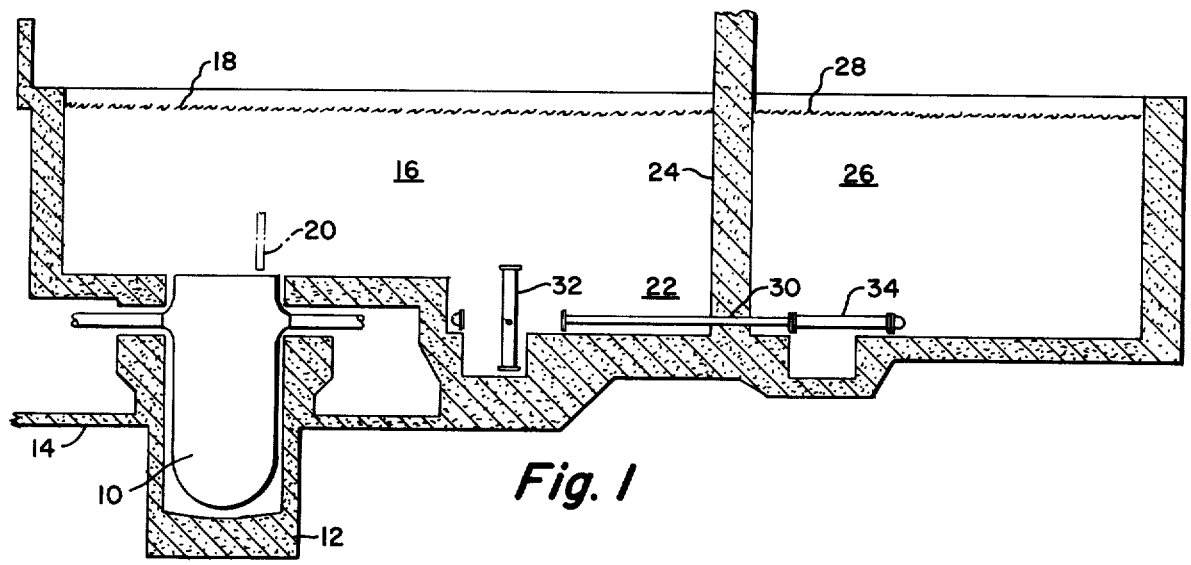
FIG. 1 is a simplified plan view of a nuclear reactor installation with which the detection apparatus of the present invention may be used.

Referring now to FIG. 1, the numeral 10 designates generally a nuclear reactor which is carried within a concrete housing 12. The housing 12 forms part of a dome-shaped concrete enclosure 14 which includes a basin 16 above the reactor 10. During refueling of the reactor 10, the basin 16 is filled with water up to the level, generally indicated at 18. However, during normal operation of the reactor, the liquid is drained from the basin 16. At the top of the basin 16 are tracks, not shown, which carry a manipulator crane. The manipulator crane, also not shown, is provided to remove or insert reactor components, such as fuel assemblies or control rods, into the reactor 10. One of such fuel components is schematically illustrated at 20.

Communicating with the basin 16 is a refueling canal or compartment 22 of concrete which terminates at the wall 24 of the concrete dome-shaped enclosure 14 for the entire nuclear reactor installation. The basin 16 and canal 22 are lined with stainless steel plates, not shown herein for purposes of simplicity.

Outside the dome-shaped enclosure 14 is a spent fuel pit or compartment 26, also constructed of concrete walls and filled with water up to the level indicated at 28. In the past, it has been common practice, in order to detect holes in nuclear fuel rods, to transfer fuel assemblies from the enclosure 14 to the spent fuel pit 26 while maintaining each spent fuel assembly beneath the level of the protective water baths. The system for accomplishing this includes a transfer tube 30 which runs horizontally through the plant enclosure wall 24. At the opposite ends of the transfer tube 30 are manipulator tubes 32 and 34. The operation of these manipulator tubes and the construction of the transfer tube 30 may be had by reference to U.S. Pat. No. 3,294,435 issued Dec. 27, 1966. For purposes of the present description, however, it will be sufficient to state that a fuel rod assembly 20, for example, is initially inserted into tube 32 while in a vertical position. Thereafter, the tube 32 is rotated in a clockwise direction as viewed in FIG. 1 such that it is aligned with the tube 30. The assembly 20 is then moved through the tube 30 to the manipulator tube 34 which is in a horizontal position. The tube 34 is then rotated, for example, in a counterclockwise direction until it is in a vertical position; whereupon the assembly 20 is removed within the spent fuel pit 26.

As was explained above, it sometimes happens that holes form in the nuclear fuel-containing tubes which make up the fuel assembly 20. Furthermore, when this occurs, water will enter the tube, engage the nuclear fuel and boil, thereby causing damage to the tube, and enlarging the size of the hole. In the past, this condition was detected by periodically transferring each fuel assembly from the reactor to the spent fuel pit 26 during normal refueling operations. Thereafter, the assembly was permitted to remain in a special container in the spent fuel pit for a period of time. If a leak existed, the water within the container would become more radioactive. Therefore, by repeatedly draining water from the container for each fuel assembly tested, and monitoring it for detection of fission products, a fuel assembly possessing a defective fuel tube could be detected. Needless to say, however, this is a lengthy, expensive, and time-consuming process resulting in considerable downtime of the reactor.

The apparatus of the invention for detecting a fuel assembly having a defective fuel rod without the necessity for using a special container, and drawing water from the container and analyzing the same is shown in FIGS. 2–5. With specific reference to FIG. 2, a spent fuel assembly 20, for example, within the spent fuel pit 26 is engaged by the lower end of a long probe 36. As will be explained hereinafter, it is necessary only to intimately contact the integral upper flange or nozzle of the fuel assembly since, if a hole exists in any fuel tube and the water entering that hole is boiling, a characteristic vibration of the tube will result. This vibration will be transmitted to the upper flange of the fuel assembly. The probe 36 may be formed of a number of different materials (e.g., metal or plastic), just so long as it has a high modulus of elasticity in order that it can transmit vibrations from the fuel assembly 20 to a vibration detector 38 which can be hand-held by an operator 40 standing on a support 42 located, for example, above the spent fuel pit 26. In this respect, the probe 36 must have a modulus of elasticity in excess of 2,000,000 psi. As will be understood, of course, the higher the modulus of elasticity, the better the performance of the device.

Figure 3:
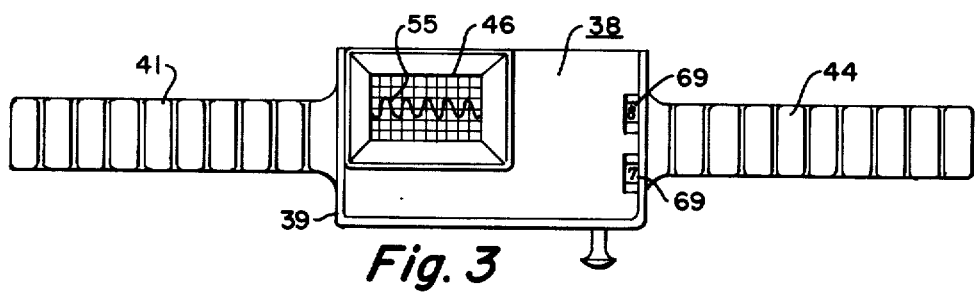
FIG. 3 is a top view of the vibration measurement apparatus of the invention.
Figure 4:
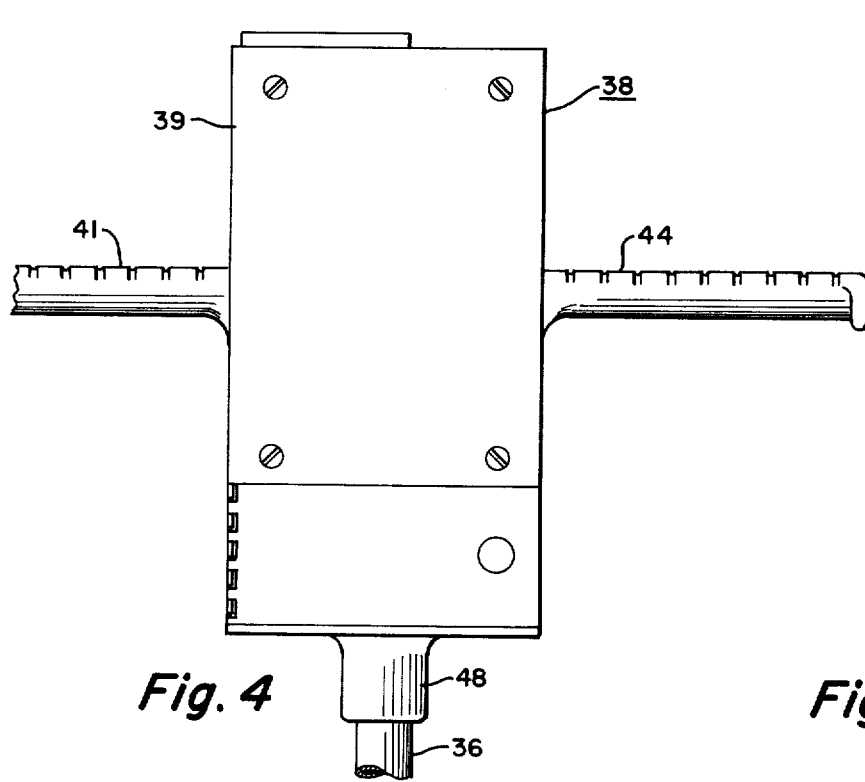
FIG. 4 is an elevational side view of the vibration detection apparatus of the invention showing the upper end of the probe which, at its bottom, contacts a fuel assembly.
Figure 5:
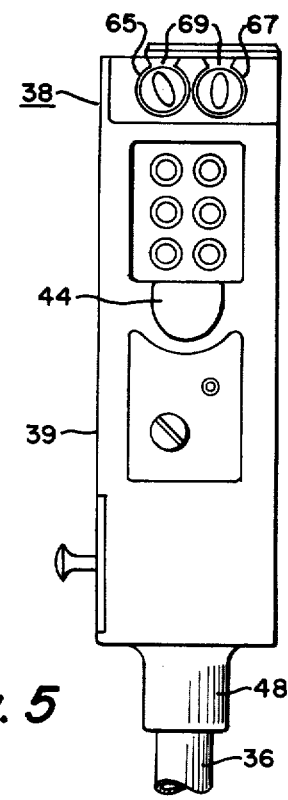
FIG. 5 is a side view of the apparatus of FIGS. 3 and 4.

With specific reference now to FIGS. 3–5, the details of the vibration detector 38 of FIG. 2 are shown. It includes an outer enclosure 39 provided with a pair of oppositely-projecting handles 41 and 44 which are grasped by the operator 40 shown in FIG. 2. Carried within the enclosure 39 is a battery-operated CRT tube, the face of which is identified by the numeral 46 in FIG. 3. The probe 36 is carried, at its upper end, within a flange 48 which projects downwardly from the enclosure 39.

The circuitry carried within the enclosure 39 is shown in FIG. 6. The upper end of the probe 36 within the enclosure 39 is engaged by the needle 50 of a crystal detector 52. The detector 52 may, for example, comprise a conventional phonographic needle assembly capable of converting the mechanical vibrations induced in the probe 36 into an electrical signal having a frequency proportional to the frequency of the vibrations and an amplitude also proportional to the magnitude of the vibrations. The resulting electrical signal produced by the transducer 52 is applied through a variable or selective filter 54 and an amplifier 56 to a CRT tube 58 whose face 46 appears at the top of the enclosure 39 and can be viewed by the operator 40 shown in FIG. 2. Additionally, the vibration signal passing through the amplifier 56 can be applied through a detector 60 to an audible buzzer 62 and/or a signal lamp 64. In a fuel assembly containing a defective fuel tube, water entering a hole in the tube will cause boiling or extreme turbulence. This, in turn, produces a characteristic vibration in the tube and in the entire fuel assembly 20. In the operation of the invention, when the bottom of the probe is placed against an assembly containing a defective tube, this characteristic vibration is transmitted through the probe 36 to the transducer 52 which then produces an electrical signal having a frequency and amplitude indicative of that characteristic vibration. The filter 54 is, therefore, tuned to the characteristic vibration. Assuming, therefore, that the fuel assembly 20 contains a defective fuel rod and that the characteristic vibration results, the variable filter 54 will pass the resulting electrical signal to the amplifier 56 and the CRT tube 58. This can be viewed as waveform 55 on the face of the CRT tube 58 or it can be used to energize the buzzer 62 or lamp 64. In either case, when a fuel rod assembly is engaged by the lower end of the probe 36 and the characteristic vibration noted on the CRT tube face 46, the operator immediately knows that the fuel assembly contains a defective fuel rod. Dials 65 and 67 (FIG. 5) can be used to vary the passband of filter 54 and gain of amplifier 56, respectively. The dials 65 and 67 carry numbers or other indicia on their peripheries which can be viewed through slots 69 in the top of enclosure 39 (FIG. 3).

A typical fuel rod assembly is shown in FIG. 7. It comprises a plurality of individual fuel rods 66 carried within a plurality of spaced egg-crate grids, only the top two grids 68 being shown in FIG. 7. The tubes 66 are attached to a top nozzle 70 in accordance with usual practice. Reciprocable within and removable from the top nozzle and the bundle of tubes 66 are control rods 72 connected to a control rod assembly handle 74. All of this is in accordance with usual reactor construction and need not be described herein in detail. The lower end of the probe 36 preferably contacts the top edge or the side of the top nozzle 70 as shown in FIG. 7. However, it can contact the assembly at almost any point since the vibrations caused by boiling or turbulence will be transmitted to all integral parts of the assembly.

The probe 36, in the preferred embodiment, is preferably hollow and carries at its lower end a cap 76 to prevent the entrance of water. In one specific example of the invention, the probe was formed of stainless steel and had a one-half inch outer diameter and a 0.024 inch wall thickness.

It can thus be seen that by simply contacting the top of the fuel rod assembly and observing the waveform on the face of the CRT tube 58, a fuel assembly having a defective fuel rod can be detected.

While the foregoing description assumes that the fuel rod assembly was transferred from the reactor to the spent fuel pit 26, the present invention is not limited to this procedure. Rather, it may be possible in certain cases to detect a defective fuel assembly without even removing the fuel assembly from the reactor 10. Alternatively, a fuel assembly can be removed from the reactor 10 while it is immersed beneath the liquid level 18 as shown in FIG. 1 and the lower end of the probe 36 engaged with the top of the assembly while it is suspended from an overhead crane. In this case, the assembly simply need be removed from the reactor, a test performed, and the assembly thereafter reinserted into the reactor, if no fault is detected.

Instead of contacting the assembly directly as shown in FIG. 7, the probe 36 can be connected to an inverted bell 80, shown in broken line outline, which slides down over and contacts the sides of the fuel assembly. The bell displaces water or other liquid within its interior such that vibrations due to defective fuel tubes will not be materially damped by the surrounding liquid.

Likewise, the vibration pickup can be mounted on the bottom of the probe 36 and connected through electrical leads to suitable indicating circuitry above the surface of the bath in the reactor or spent fuel pit.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Apparatus for detecting a defective nuclear fuel rod in an assembly of such fuel rods immersed in a liquid, comprising a probe having a lower end adapted to engage said assembly of rods, a vibration detector attached to said probe, the lower end of said probe contacting a fuel assembly immersed in said liquid whereby vibrations resulting from boiling or turbulent liquid which has leaked into a fuel rod will be transmitted through said probe to the vibration detector which will indicate the existence of a defective fuel rod, and an inverted bell connected to the lower end of said probe and adapted to slide down over a fuel rod assembly, whereby the bell displaces liquid within its interior such that the vibrations due to defective fuel rods will not be damped materially by the surrounding liquid.

* * * * *